(12) United States Patent
Iwakata et al.

(10) Patent No.: US 8,585,220 B2
(45) Date of Patent: Nov. 19, 2013

(54) OPTICAL ELEMENT AND METHOD OF PRODUCING SAME

(75) Inventors: Masahide Iwakata, Kawasaki (JP); Kazuhiro Arai, Yokohama (JP); Junji Terada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 257 days.

(21) Appl. No.: 12/937,384

(22) PCT Filed: May 26, 2009

(86) PCT No.: PCT/JP2009/059932
§ 371 (c)(1),
(2), (4) Date: Oct. 12, 2010

(87) PCT Pub. No.: WO2009/145334
PCT Pub. Date: Dec. 3, 2009

(65) Prior Publication Data
US 2011/0032613 A1     Feb. 10, 2011

(30) Foreign Application Priority Data

May 26, 2008  (JP) ................................ 2008-136579
May 25, 2009  (JP) ................................ 2009-125288

(51) Int. Cl.
*G02B 23/16*      (2006.01)
*G02B 5/124*      (2006.01)

(52) U.S. Cl.
USPC .......................................... 359/513; 359/514

(58) Field of Classification Search
None
See application file for complete search history.

(56) References Cited

U.S. PATENT DOCUMENTS

| | | |
|---|---|---|
| 4,957,358 A | 9/1990 | Terada et al. |
| 5,015,523 A | 5/1991 | Kawashima et al. |
| 5,496,616 A | 3/1996 | Harris |
| 5,725,959 A | 3/1998 | Terada et al. |
| 6,317,274 B1 | 11/2001 | Kato et al. |

(Continued)

FOREIGN PATENT DOCUMENTS

| | | |
|---|---|---|
| CN | 1497273 A | 5/2004 |
| CN | 1605042 A | 4/2005 |

(Continued)

OTHER PUBLICATIONS

Dec. 9, 2010 International Preliminary Report on Patentability in International Patent Appln. No. PCT/JP2009/059932.

(Continued)

*Primary Examiner* — Jade R Chwasz
(74) *Attorney, Agent, or Firm* — Fitzpatrick, Cella, Harper & Scinto (57) ABSTRACT

Provided is a method of producing an optical element, including: forming a frame portion on a substrate and forming a structural body in a space portion surrounded by the frame portion to thereby form a first optical member; disposing a second optical member on the first optical member in a reduced pressure environment to form an optical element in which the space portion is sealed in a pressure-reduced state; and exposing the optical element to the atmosphere to thereby bring the structural body and the second optical member into close contact with each other by a differential pressure between the atmosphere and the space portion sealed in the pressure-reduced state. Accordingly, it is possible to, when the optical element is bonded, suppress damage to the optical element during the bonding and further improve the function and strength of the optical element without use of an adhesive.

6 Claims, 5 Drawing Sheets

(56) References Cited

U.S. PATENT DOCUMENTS

| | | | |
|---|---|---|---|
| 6,462,875 B1 * | 10/2002 | Ishii | 359/576 |
| 6,523,963 B2 * | 2/2003 | Nakabayashi | 359/513 |
| 6,665,119 B1 | 12/2003 | Kurtz et al. | |
| 6,788,461 B2 | 9/2004 | Kurtz et al. | |
| 2002/0024734 A1 | 2/2002 | Nakabayashi | |
| 2003/0117708 A1 | 6/2003 | Kane | |
| 2004/0070829 A1 | 4/2004 | Kurtz et al. | |
| 2007/0201135 A1 | 8/2007 | Sakamoto et al. | |
| 2008/0036964 A1 | 2/2008 | Miura et al. | |

FOREIGN PATENT DOCUMENTS

| | | |
|---|---|---|
| EP | 1 022 589 A1 | 7/2000 |
| JP | 2000-56198 A | 2/2000 |
| JP | 2000-227511 A | 8/2000 |
| JP | 2000-275417 A | 10/2000 |
| JP | 2000-314803 A | 11/2000 |
| JP | 2005-043853 A | 2/2005 |
| WO | 2006/081006 A2 | 8/2006 |

OTHER PUBLICATIONS

Jan. 18, 2012 Chinese Official Action in Chinese Patent Appln. No. 200980118836.9.
May 19, 2011 Extended European Search Report in European Patent Appln. No. 09754842.4.
Sep. 8, 2009 International Search Report in PCT/JP2009/059932.
Nov. 5, 2012 Chinese Official Action in Chinese Patent Appln. No. 200980118836.9.
May 8, 2013 European Search Report in European Patent Appln. No. 09754842.4.
Apr. 28, 2013 Chinese Official Action in Chinese Patent Appln. No. 200980118836.9.

* cited by examiner

OPTICAL ELEMENT AND METHOD OF PRODUCING SAME

TECHNICAL FIELD

The present invention relates to an optical element and a method of producing the optical element. In particular, the present invention relates to a transmissive optical element having a three-dimensional hollow structure, such as a polarization beam splitter, a phase plate, or a bandpass filter which has on a surface thereof a structure with an in-plane period shorter than a wavelength of visible light, and to a method of producing the same. The term "in-plane period" herein employed refers to a state in which a structural body is periodically arranged in a plane.

BACKGROUND ART

In recent years, transmissive optical elements such as a polarization beam splitter and a bandpass filter have been actively developed. Such a transmissive optical element has been conventionally formed in a multi-layer film structure. However, in order to obtain higher luminance and contrast of a projector or the like, a microscopic three-dimensional hollow structural body formed at a pitch equal to or smaller than that of visible light wavelength has been recently developed. U.S. Patent Application Publication No. 2007/0201135 proposes an optical element having a three-dimensional structure and a method of producing the optical element.

Incidentally, in the method of producing a transmissive micro optical element of U.S. Patent Application Publication No. 2007/0201135, an adhesive is used when a microscopic three-dimensional hollow structural body is bonded to a substrate. However, because the element has a microscopic three-dimensional hollow structure, it is found, when the adhesive is used for bonding to the substrate, that a capillary phenomenon occurs in a gap and the adhesive adheres to the inside of the structural body, which generates fluctuations in refractive index. Therefore, a bonding technology without using the adhesive is desired. However, a structure with the in-plane period shorter than the wavelength of visible light and with a particularly small line width and dot diameter is low in strength, and hence the structural body is damaged when applied with a large load. If a non-contact part is generated between the structural body formed on the substrate and a bonding substrate, incident light may be reflected thereby, thus leading to a possible decrease in optical performance of the optical element. Moreover, a load is concentrated on a contact part, and thus the structural body may be damaged.

DISCLOSURE OF THE INVENTION

In view of the above-mentioned problems, an object of the present invention is to provide an optical element and a method of producing the optical element which enable the optical element to be bonded without use of an adhesive, suppress damage to the optical element during bonding, and further improve the function and strength thereof.

According to the present invention, a method of producing an optical element, which includes a first optical member and a second optical member, includes: forming a frame portion on a substrate and forming a structural body in a space portion surrounded by the frame portion to thereby form a first optical member; disposing a second optical member on the first optical member in a reduced pressure environment to form an optical element in which the space portion is sealed in a pressure-reduced state; and exposing the optical element to the atmosphere to thereby bring the structural body and the second optical member into close contact with each other by a differential pressure between the atmosphere and the space portion sealed in the pressure-reduced state.

An optical element according to the present invention includes: a first optical member having a frame portion formed on a substrate and having a structural body formed in a space portion surrounded by the frame portion on the substrate; and a second optical member disposed on the first optical member so as to seal the space portion, wherein the space portion is pressure-reduced.

According to the present invention, there can be realized a method of producing an optical element, and an optical element which enable bonding of the optical element without use of an adhesive, suppress damage to the element during bonding, and further improve the function and strength thereof.

Further features of the present invention become apparent from the following description of exemplary embodiments with reference to the attached drawings.

BEST MODES FOR CARRYING OUT THE INVENTION

Preferred embodiments of the present invention will now be described in detail with reference to the accompanying drawings.

First Embodiment

FIGS. 2A to 2D are cross-sectional views for illustrating a method of producing an optical element according to a first embodiment of the present invention. In FIGS. 2A to 2D, reference numerals 1, 2, 3, 4, 5, 9, and 10 denote a substrate made of optical glass or the like, a second optical member formed of a substrate made of optical glass according to this embodiment or the like, a frame portion, a space portion, a structural body, a dielectric film, and a resist for patterning, respectively. In this embodiment, the substrate 1, the frame portion 3, and the structural body 5 are together referred to as a first optical member.

(Step of Forming First Optical Member)

Figure 2A:
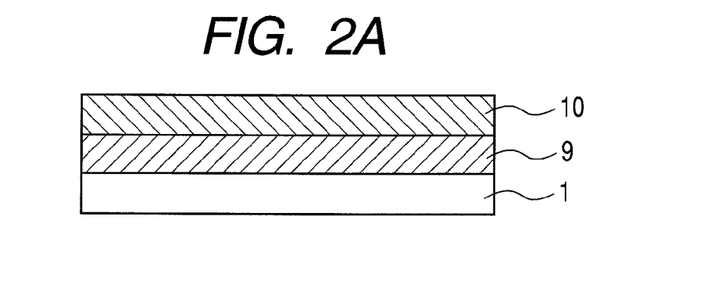
FIGS. 2A, 2B, 2C and 2D are cross-sectional views for illustrating the steps of a method of producing an optical element according to the first embodiment of the present invention.

First, in the step illustrated in FIG. 2A, the dielectric film 9 mainly containing at least one kind of oxide among titanium oxide, niobium oxide, zirconium oxide, aluminium oxide, yttlium oxide, hafnium oxide, tantalum oxide, and silicon oxide is formed on the substrate 1. Then, the resist 10 is further applied thereon.

Figure 2B:
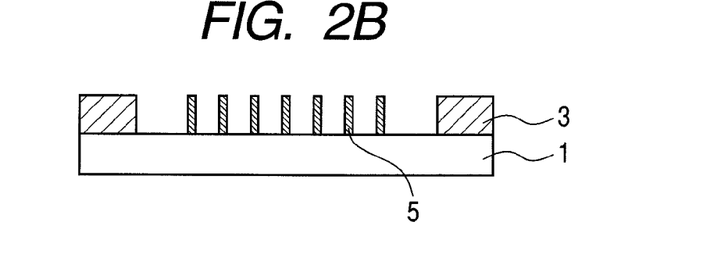

Next, in the step illustrated in FIG. 2B, exposure, development, and dry etching are performed, to thereby form the frame portion 3 and the structural body 5 on the substrate 1. Incidentally, in this embodiment, the structural body 5 has a line structure with an in-plane period shorter than a wavelength of visible light, which is formed by the repetition of the space portion and the structure portion. However, this structural body is not limited to the one according to this embodiment, and various forms may be conceivable as long as the structural body is formed in the space portion formed on the substrate 1, which is surrounded by the frame portion 3 on the substrate 1. For example, the structural body can be formed in a line pattern (line structure), a hole pattern (hole structure), or a dot pattern (dot structure) according to design.

(Step of Forming Optical Element in which Space Portion is Sealed and Pressure-Reduced)

Figure 2C:
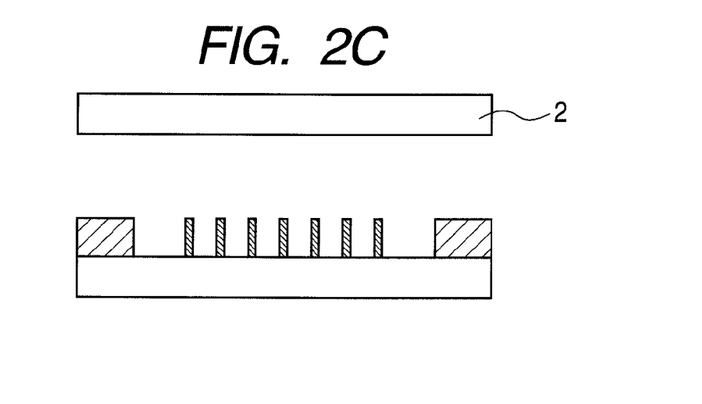

Next, in the step illustrated in FIG. 2C, the first optical member having the frame portion and the structural body formed on the substrate 1 and the second optical member 2 formed of, for example, the substrate 2 are provided. In the step illustrated in FIG. 2D, the frame portion and the second optical member are brought into contact with each other, thereby sealing the space portion surrounded by the frame portion. More specifically, the patterned first optical member and the second optical member are prepared in a vacuum chamber. Next, the vacuum chamber is evacuated to about 10e-1 Pa to 10e-7 Pa, and the second optical member 2 is placed on the frame portion 3 of the first optical member. Accordingly, an upper surface of the frame portion 3 of the first optical member is brought into contact with the second optical member, and the first optical member and the second optical member are bonded to each other, with the result that the optical element 12 in which the space portion 4 is sealed and pressure-reduced can be obtained.

Figure 3A:
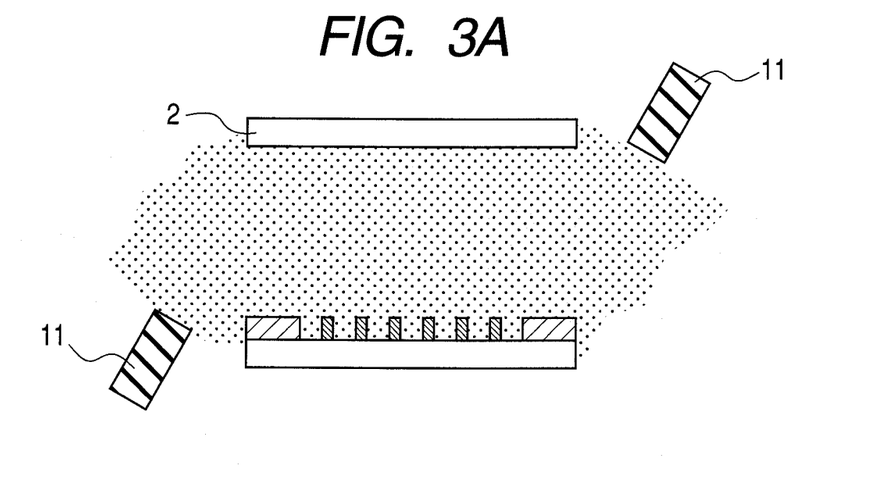
FIGS. 3A, 3B and 3C are cross-sectional views for illustrating the steps of a method of producing an optical element according to another embodiment of the present invention.

As illustrated in FIG. 3A, the contact surfaces of the first optical member 1 and the second optical member may be irradiated with an argon ion beam with the use of an ion beam gun 11 or the like. The entire contact surfaces of the first optical member 1 and the second optical member 2 are favorably irradiated with the argon ion beam. As a result, the respective contact surfaces of the first optical member 1 and the second optical member 2 can be cleaned and activated, and the respective contact surfaces are more easily bonded to each other with higher accuracy, which improving sealing precision. Incidentally, an applied voltage and an irradiation time of the ion beam gun 11 are favorably 30 to 600 V, and about 30 seconds to one hour, respectively. As a cleaning and activating means, other plasma, radical beam, atomic beam, laser, or ramp may be used in place of the argon ion beam, and similar results can be obtained in such a case. As a gas type, other inert gas, oxygen, or carbon dioxide may effectively be used.

Figure 3B:
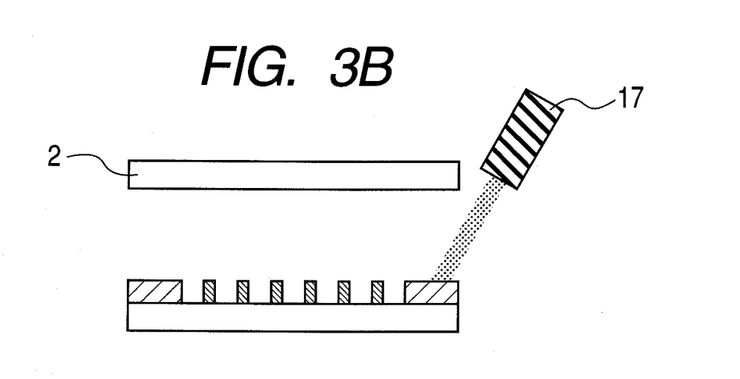
Figure 3C:
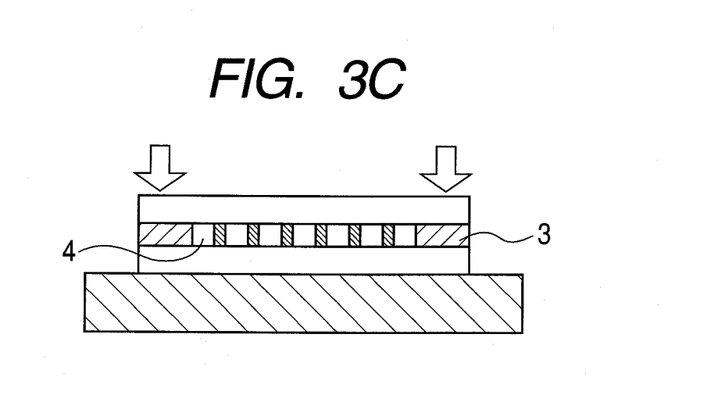

As illustrated in FIG. 3C, the frame portion 3 may be pressurized in a direction indicated by outline arrows as well as heated, and the contact surfaces may be activated to be bonded to each other, whereby the space portion 4 formed on the optical glass substrate 1, which is surrounded by the frame portion 3, is vacuum-sealed. Incidentally, the pressurization and heating are favorably performed with 0.001 N/mm$^2$ to 100 N/mm$^2$ and at room temperature to 400° C., respectively. Accordingly, the first optical member and the second optical member can be bonded to each other more firmly, which further improves the sealing precision.

Further, as illustrated in FIG. 3B, in a pressure-reduced chamber (vacuum chamber) at 10e-2 to 10e-5 Pa, the frame portion 3 may be irradiated with pressure-reduced plasma containing hydrofluoric acid or hydrofluoric acid gas, and a surface thereof may be dissolved. As hydrofluoric acid irradiation conditions employing a plasma jet system, NF-, SF-, CF-, or F$_2$ plasma may be used. Alternatively, as a background of the vacuum chamber, air containing H$_2$O may be filled, to thereby generate HF. As other methods of generating HF, for example, a method of adjusting humidity by bubbling of source gas in H$_2$O is also effective. When the bonding is accomplished by hydrofluoric acid, bonding can be enabled with low pressurization at low temperature. Further, by bonding through dissolving, bonding with higher strength can be achieved. As a result, the area of the frame portion for vacuum sealing can be reduced, thereby reducing the entire element size.

(Step of Bringing Structural Body and Second Optical Member Into Contact with Each Other)

Figure 2D:
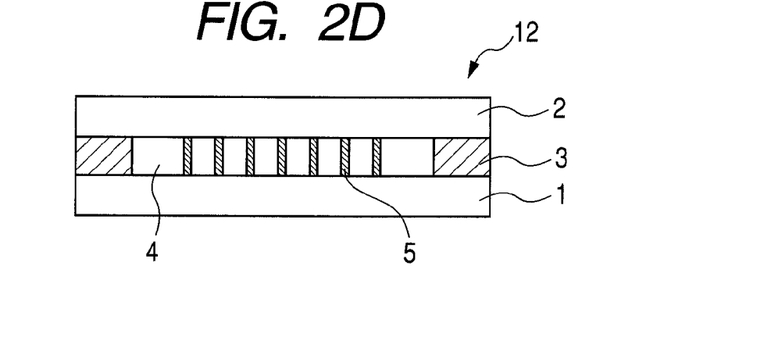

Next, for example, the vacuum chamber is made open to the atmosphere, or the optical element is taken out in the atmosphere, whereby the optical element 12 is exposed to the atmosphere. When the optical element 12 is exposed to the atmosphere, the structural body 5 and the second optical member 2 are brought into contact with each other owing to a differential pressure between the atmospheric pressure and the pressure inside the space portion which is sealed in the reduced pressure environment. Because of the differential pressure between the pressure of the space portion and the atmospheric pressure, the second optical member is uniformly pressed against the upper surface (contact surface with the second optical member) of the structural body 5, and thus a load is not concentrated on one part. For this reason, the structural body is not damaged. In addition, the second optical member is uniformly pressed, and hence the non-contact part is unlikely to be generated between the upper surface (contact surface with the second optical member) of the structural body and the second optical member. Therefore, the optical element 12 exhibits excellent performance as an optical element.

The contact between the upper surfaces (contact surfaces with the second optical member) of the structural body 5 and the frame portion 3 and the second optical member 2 may be optical contact. The term "optical contact" herein employed refers to a state in which interaction acts on molecules of a surface to stabilize the molecules as internal molecules, and the surface is bonded. The second optical member is uniformly pressed, and hence the upper surface of the structural body 5 and the second optical member 2 are brought into contact with each other. In addition, the space portion is pressure-reduced, whereby air hardly exists between the structural body 5 and the second optical member 2. Therefore, the optical contact is obtained more easily.

Furthermore, it is also favorable to uniformly apply the force owing to the pressure-reduced space portion such that the substrate 1 and the lower surfaces of the structural body and the frame portion 3 are brought into contact with each other in optical contact. Furthermore, by heating the optical element 12, the upper surface of the structural body and the second optical member can be closely bonded to each other, thereby further improving the strength thereof.

The formation of the optical element in the above described manner avoids optical loss due to total reflection of incident light, and a high-efficiency transmissive micro optical element can be achieved.

Figure 1:
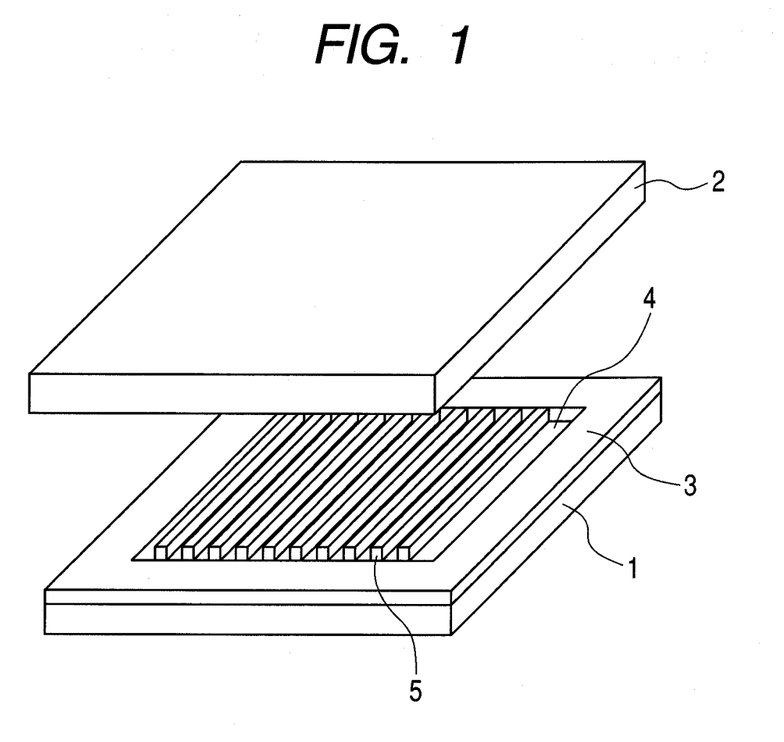
FIG. 1 is a perspective view of an optical element according to a first embodiment of the present invention.

Next, the optical element according to the present invention is described. FIG. 1 is an exploded perspective view of an optical element according to an embodiment of the present invention. In FIG. 1, the optical element includes the substrate 1 made of optical glass or the like, the second optical member 2 formed of, for example, a substrate made of optical glass or the like, the frame portion 3, the space portion 4, and the structural body 5.

In the first optical member, the frame portion 3 and the structural body 5 formed in the space portion surrounded by the frame portion 3 are formed on the substrate 1. The frame portion 3 and the structural body 5 are formed of a dielectric film mainly containing at least one kind of oxide selected from titanium oxide, niobium oxide, zirconium oxide, aluminium oxide, yttrium oxide, hafnium oxide, tantalum oxide, and silicon oxide. In addition, the first optical member has a structure with an in-plane period shorter than a wavelength of visible light, which is formed by repetition of the space portion and the structure portion. This structural body can be formed in a line pattern (line structure), a hole pattern (hole structure), or a dot pattern (dot structure) according to design.

The second optical member is the substrate 2 made of optical glass or the like in this embodiment. However, the second optical member is not limited to that of this embodiment, and may include the structural body formed therein as is the case with the first optical member. In this way, various forms are conceivable. The optical element according to the present invention is formed of the first optical member and the second optical member. The second optical member is illustrated in a non-contact state for illustrating the inner structure of the optical element. However, actually, the space portion 4 is pressure-reduced, and the upper surface (contact surface with the second optical member) of the structural body adheres to the second optical member and is fixed. The optical element is favorably an optical element in an optical contact state. The term "optical contact" herein employed refers to a state in which interaction acts on molecules in a surface to stabilize the molecules as internal molecules, and the surface is bonded. The space portion is pressure-reduced, whereby air hardly exists between the structural body 5 and the second optical member. Therefore, the optical contact is obtained more easily. More favorably, the substrate 1 and the lower surface of the structural body 5 and the frame portion 3 are in optical contact. Air hardly exists therebetween as well, whereby the optical contact is obtained more easily. The optical element as described above avoids optical loss due to total reflection of incident light, and can achieve highly efficient optical performance.

Second Embodiment

Next, a method of producing an optical element and an optical element according to a second embodiment of the present invention are described. FIGS. 4A to 4E are cross-sectional views for illustrating the method of producing an optical element and the optical element according to this embodiment. In FIGS. 4A to 4E, components similar to those of the components illustrated in FIGS. 2A to 2D are identified by the same reference numerals, and their descriptions are omitted.

(Step of Forming First Optical Member)

Figure 4A:
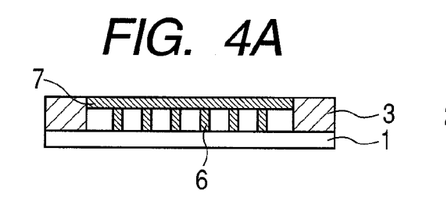
FIGS. 4A, 4B, 4C, 4D and 4E are cross-sectional views for illustrating the steps of a method of producing an optical element according a second embodiment of the present invention.

First, in the step shown in FIG. 4A, the frame portion 3, a structural body 6, and a structural body 7 are formed on the substrate 1, thereby forming the first optical member. The first optical member is formed by forming a dielectric film mainly containing at least one kind of oxide selected from titanium oxide, niobium oxide, zirconium oxide, aluminium oxide, yttrium oxide, hafnium oxide, tantalum oxide, and silicon oxide. Then, a resist is further applied thereon. Next, exposure, development, and dry etching are performed, whereby the frame portion 3, the structural body 6, and the structural body 7 are formed on the substrate 1. In this embodiment, the structural body 6 having a line structure with the in-plane period shorter than a wavelength of visible light, which is formed by repetition of the space portion and the structure portion, is formed. Then, the structural body 7 having the line structure in a direction which is perpendicular to the line structure of the structural body 6 is formed thereon. However, it goes without saying that the structural body is not limited to that of this embodiment, and various forms are conceivable. For example, the structural body may be formed in only one tier of the structural body 6 or formed of stacked structural bodies in three or more tiers as long as the structural body is formed in the space portion on the substrate 1, which is surrounded by the frame portion 3 formed on the substrate 1. Furthermore, the structure is not limited to the line structure, and the structural body can be formed in a line pattern (line structure), a hole pattern (hole structure), or a dot pattern (dot structure) according to design.

(Step of Forming Second Optical Member)

Figure 4B:
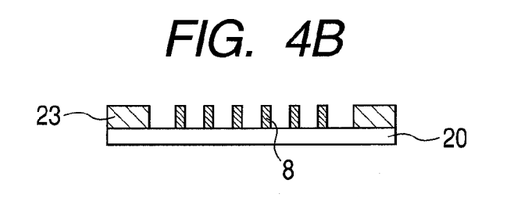

In a step illustrated in FIG. 4B, a second frame portion 23 and a structural body 8 serving as a second structural body are formed on a second substrate 20 made of optical glass or the like, to thereby form the second optical member. As is the case with the first optical member described above, the second optical member is formed by forming on the substrate 20 a dielectric film made of titanium oxide, niobium oxide, zirconium oxide, aluminium oxide, yttrium oxide, hafnium oxide, tantalum oxide, silicon oxide, or the like. Then, a resist is further applied thereon. Next, exposure, development, and dry etching are performed, whereby the second frame portion 23 and the second structural body 8 are formed on the second substrate 20. In this embodiment, the structural body 8 having a line structure with the in-plane period shorter than a wavelength of visible light, which is formed by repetition of the space portion and the structure portion, is formed. However, it goes without saying that the second structural body is not limited to that of this embodiment, and various forms are conceivable. For example, the second structural body may be formed in only one tier of the second structural body 8 or formed of stacked structural bodies in three or more tiers as long as the second structural body is formed in the space portion on the substrate 20, which is surrounded by the frame portion 23 formed on the substrate 20. Furthermore, the second structural body can be formed in a line pattern (line structure), a hole pattern (hole structure), or a dot pattern (dot structure) according to design.

(Step of Forming Optical Element in which Space Portion is Sealed and Pressure-Reduced)

Figure 4C:
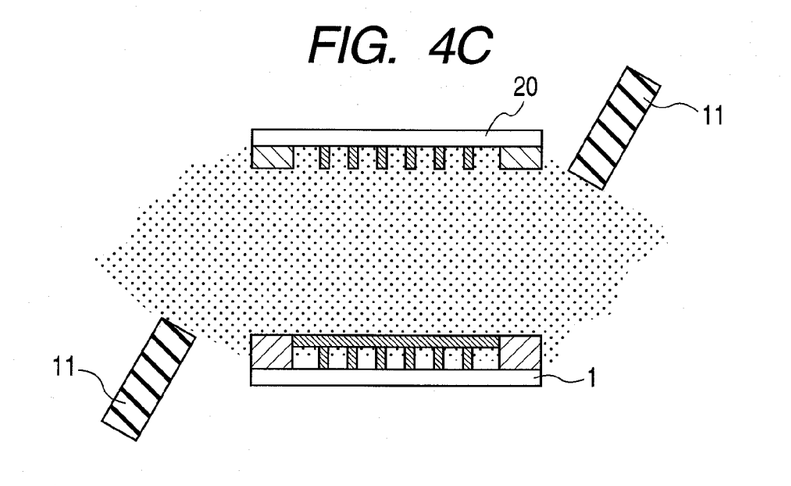

Next, the patterned first optical member and second optical member are prepared in a vacuum chamber. As shown in FIG. 4C, in order to clean and activate the first optical member and the second optical member, an argon ion beam may be irradiated with the use of the ion beam gun 11 or the like. Incidentally, an applied voltage and an irradiation time of the ion beam gun 11 are favorably 30 to 600 V, and about 30 seconds to one hour, respectively. In this case, an argon ion beam is used as a cleaning and activating means. Alternatively, cleaning and activation can be performed by other plasma, radical beam, atomic beam, laser, or ramp, and similar results can be obtained also in such a case. As a gas type, other inert gas, oxygen, or carbon dioxide may effectively be used.

Figure 4D:
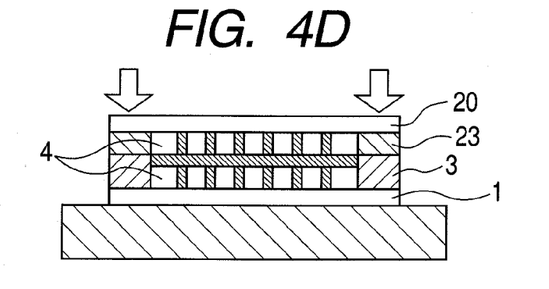

Next, in the step shown in FIG. 4D, the first optical member and the second optical member are arranged such that the frame portion 3 of the first optical member and the frame portion 23 of the second optical member are opposed to each other in a vacuum chamber of about 10e-1 Pa to 10e-7 Pa. Then, portions which are in the vicinity of the portions indicated by outline arrows, which correspond to the frame portion 3, are pressurized and heated, the frame portion 3 of the first optical member and the frame portion 23 of the second optical member are bonded to each other, and the space portions 4 are vacuum-sealed, with the result that an optical element 14 is formed. Incidentally, the pressurization and heating are favorably performed with 0.1 N/mm$^2$ to 100 N/mm$^2$ and at 200° C. to 400° C., respectively.

(Step of Bringing Structural Body and Second Optical Member into Contact with Each Other)

Figure 4E:
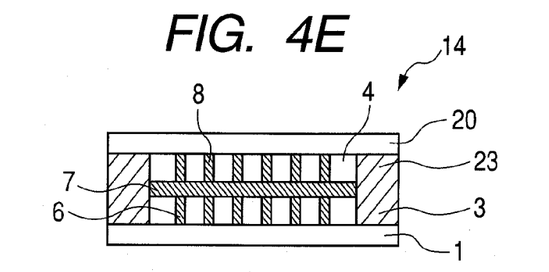

After that, in the step shown in FIG. 4e, the optical element 14 is exposed to the atmosphere.

Here, when the optical element 14 is exposed to the atmosphere, the structural body 7 of the first optical member and the second optical member are caused to adhere to each other owing to a differential pressure between the atmospheric pressure and the pressure inside the space portion which is sealed under the reduced pressure environment. In this embodiment, the structural body 7 of the first optical member and the second structural body 8 of the second optical member are caused to adhere and are fixed to each other. The second structural body 8 is uniformly pressed against the upper surface (contact surface with the second structural body 8) of the structural body 7 by the differential pressure between the pressure of the space portion and the atmospheric pressure, and hence a load is not concentrated on one part. Accordingly, the structural body is not damaged. In addition, because the second structural body 8 is uniformly pressed, a non-contact part is hardly generated between the upper surface (contact surface with the second optical member) of the structural body 7 and the second structural body 8, whereby the optical element 14 exhibits excellent performance as an optical element.

The contact between the upper surfaces (contact surfaces with the second optical member) of the structural body 7 and the frame portion 3 and the second structural body 8 are favorably in optical contact. The term "optical contact" herein employed refers to a state in which interaction acts on molecules in a surface to stabilize the molecules as internal molecule, and the surface is bonded. The space portion is pressure-reduced, whereby air hardly exists between the structural body 7 and the second structural body 8. Therefore, the optical contact is obtained more easily.

Furthermore, the optical contact is favorably obtained between the structural body 6 and the structural body 7, between the structural body 6 and the frame portion 3, and the substrate 1, and between the structural body 8 and the frame portion 23, and the substrate 20. In the same manner, the space portion is pressure-reduced and air hardly exists between the structural bodies and between the structural body and the substrate, whereby the optical contact is obtained more easily.

Furthermore, by heating the optical element 14, the upper surface of the structural body 7 and the second optical member (second structural body 8) can be closely bonded to each other, so that the strength thereof can be further improved.

When the optical element is formed in this manner, optical loss due to total reflection of incident light can be avoided. When the optical contact is obtained between the respective components, a higher-efficiency transmissive micro optical element can be achieved.

Next, the optical element according to the second embodiment, which is produced according to the second embodiment, is described. In the first optical member, on the substrate 1, the frame 3 and the structural body 6 and the structural body 7 formed in the space portion surrounded by the frame portion 3 are formed. The frame portion 3, the structural body 6, and the structural body 7 are made of a dielectric film mainly containing at least one kind of oxide selected from titanium oxide, niobium oxide, zirconium oxide, aluminium oxide, yttrium oxide, hafnium oxide, tantalum oxide, and silicon oxide. In this embodiment, the structural body 6 having a line structure with the in-plane period shorter than a wavelength of visible light, which is formed by repetition of the space portion and the structure portion, is formed. The structural body 7 having the line structure in a direction which is perpendicular to the line structure of the structural body 6 is formed thereon. However, it goes without saying that the structural bodies are not limited to those of this embodiment, and various forms are conceivable. For example, the structural bodies may be formed in only one tier of the structural body 6 or may be a stacked structural body formed in three or more tiers as long as the structural bodies are formed in the space portion on the substrate 1, which is surrounded by the frame portion 3 formed on the substrate 1. Furthermore, the structure is not limited to the line structure, and the structural body can be formed in a line pattern (line structure), a hole pattern (hole structure), or a dot pattern (dot structure) according to design.

In this embodiment, in the second optical member, the second frame portion 23 and the second structural body 8 are formed on the second substrate 20 made of optical glass or the like. The second frame portion 23 and the second structural body 8 are formed of a dielectric film mainly containing at least one kind of oxide selected from titanium oxide, niobium oxide, zirconium oxide, aluminium oxide, yttrium oxide, hafnium oxide, tantalum oxide, and silicon oxide. In this embodiment, the second structural body 8 has a line structure with the in-plane period shorter than a wavelength of visible light, which is formed by repetition of the space portion and the second structural body 8. However, it goes without saying that the structural body is not limited to that of this embodiment, and various forms are conceivable. For example, the structural body may be a formed of stacked multiple structural bodies in two or more tiers as long as the structural body is formed in the space portion on the substrate 20, which is surrounded by the frame portion 23 formed on the substrate 20. Furthermore, the structure is not limited to the line structure, and can be formed in a line pattern (line structure), a hole pattern (hole structure), or a dot pattern (dot structure) according to design. The space portion 4 is pressure-reduced, and thus the upper surface (contact surface with the second optical member) of the structural body closely adheres to the second optical member. The optical element is favorably an optical element being in optical contact. The term "optical contact" refers to a state in which interaction acts on molecules in a surface to stabilize the molecules as internal molecule. The space portion is pressure-reduced, whereby air hardly exists between the structural body 7 and the second structural body 8. Therefore, the optical contact is obtained more easily. The optical contact is favorably obtained between the structural body 6 and the structural body 7, between the structural body 6 and the frame portion 3, and the substrate 1, and between the structural body 8 and the frame portion 23, and the substrate 20 as well. Air hardly exists between the structural body 8 and the frame portion 23, and the substrate 20 as well, whereby the optical contact is obtained more easily. As described above, the formation of the optical element in which air hardly exists between the structural body and the substrate avoids optical loss due to total reflection of incident light. Furthermore, the respective components are in optical contact, with the result that a higher-efficiency transmissive micro optical element can be achieved.

The present invention has been described by way of the respective embodiments. The present invention is suitably applicable to a transmissive micro optical element in the field of a camera, a projector, an optical pickup, an optical communication, or the like.

As described above, with the configurations according to the first and second embodiments, the frame portion is formed on the optical glass substrate, and bonding with the second optical member is performed by means of the frame portion, with the result that the space portion is sealed in a pressure-reduced state. Then, the optical element is exposed to the atmosphere, with the result that, owing to a differential pressure between the atmospheric pressure and the pressure inside the vacuum-sealed space portion, the upper surface of the structural body of the first optical member can be brought into contact with the second optical member with uniform pressure, and closely adhere to the second optical member. In addition, the air which exists between the upper surface of the structural body and the second optical member can be reduced, and hence the optical contact can be obtained more easily. Therefore, light reflection occurring on the bonding surface can be eliminated, which enables to improve optical loss significantly.

Furthermore, when bonding the first optical member and the second optical member to each other, an energy wave is irradiated for cleaning and activating the first and second optical members, whereby the first optical member and the second optical member are bonded to each other efficiently. Moreover, the optical element is exposed to the atmosphere, and the structural body and the optical member are heated after being brought into contact with each other. Accordingly, the structural body and the optical member can be closely bonded to each other, which further improves the strength of the optical element.

EXAMPLES

Examples of the present invention are described below.

Example 1

In Example 1, an example to which the method of producing an optical element according to the first embodiment is applied was carried out. First, a film of titanium oxide ($TiO_2$) was formed on an optical glass substrate, and a resist was further applied thereon to prepare a substrate. Next, exposure, development, and dry etching were performed, thereby forming on the optical glass substrate a frame portion and a linear structural body having a line of 56 nm, a space of 84 nm, and a pitch of 140 nm. Next, a first optical member including the frame portion and the structural body and a second optical member formed of a glass substrate were prepared and placed in a vacuum chamber. Then, in order to clean and activate surfaces of the first optical member including the frame portion and the structural body on the optical glass substrate 1 and the second optical member, an argon ion beam was irradiated at 200 V for ten minutes with the use of an ion beam gun. Next, in the vacuum chamber of about 10e-5 Pa, the second optical member was disposed on the first optical member, and the frame portion and the second optical member were bonded to each other, whereby the optical element was formed through vacuum sealing of the space portion. Then, heating was performed at 250° C. for one hour in the state in which the frame portion 3 was being pressurized with 5 $N/mm^2$ in a direction such as indicated by outline arrows in FIG. 3C, and the frame portion 3 of the first substrate and the second substrate were bonded to each other, with the result that the space portion 4 was vacuum-sealed. After that, the optical element was exposed to the atmosphere. Incidentally, activation and vacuum sealing were performed in different vacuum chambers in this example, but when activation and vacuum sealing are performed in the same chamber or in a consistent vacuum step, the reproducibility is improved.

Next, the thus obtained optical element was sandwiched by 45° prism made of optical glass of SF6, and a reflectance thereof in a visible light range was evaluated. The evaluation revealed that the reflectance of incident light was reduced significantly. The incident light is totally reflected in a state in which there is a gap between the structural body and the second optical member, and hence it was confirmed that, in the optical element according to this example, the upper surface of the structural body was brought into contact with the glass substrate of the second optical member without a gap. In addition, it was confirmed that the lower surface of the structural body was also brought into contact with the optical glass substrate of the first optical member without a gap.

Example 2

In Example 2, an example of the application, in which the step of cleaning and activating a surface, the step of bonding with hydrofluoric acid, and the step of bonding through heating and pressurization are added to the method of producing an optical element according to Example 1, was carried out.

First, a film of titanium oxide ($TiO_2$) having an amorphous structure was formed on an optical glass substrate, and a resist was further applied thereon to prepare a substrate. Next, exposure, development, and dry etching were performed, to thereby form on the optical substrate a frame portion and the linear structural body having a line of 56 nm, a space of 84 nm, and a pitch of 140 nm. Then, the patterned first optical member and the second optical member were prepared and placed in respective vacuum chambers. Then, in order to clean and activate the surfaces of the first optical member including the frame portion and the structural body on the optical glass substrate and the second optical member, an argon ion beam was irradiated at 200 V for ten minutes with the use of an ion beam gun. Next, the first optical member including the frame portion and the structural body and the second optical member were prepared and placed in a vacuum chamber. Then, in order to dissolve the frame portion of the first optical member including the frame portion and the structural body on the optical glass substrate 1, the frame portion was irradiated with hydrofluoric acid by plasma jet. The discharge conditions of hydrofluoric acid plasma jet are as follows: a frequency of a microwave was 2.45 GHz; power was 50 W; and a flow rate of used gas was $SF_6/Ar=50/400$ (SCCM). As a background of the vacuum chamber, air containing $N_2$ and $H_2O$ was filled, and the vacuum chamber was pressure-reduced to 10e+5 Pa.

Next, in the vacuum chamber of about 10e-5 Pa, the second optical member was disposed on the first optical member in which the frame portion thereof had been dissolved by hydrofluoric acid.

Then, a portion corresponding to the frame portion of the first optical member was heated at 250° for one hour in a state of being pressurized with 0.1 $N/mm^2$ in a direction such as indicated by outline arrows in FIG. 3C from above the second optical member, the frame portion of the first optical member and the second optical member were bonded to each other, and the space portion was vacuum-sealed, whereby the optical element was formed.

After that, the optical element was exposed to the atmosphere, whereby the structural body and the second optical member were brought into contact with each other. Incidentally, the activating step, dissolving step, and vacuum sealing were performed in the different vacuum chambers in this example, but when those steps are performed in the same chamber or in a consistent vacuum step, the reproducibility is improved.

Next, the thus obtained optical element was sandwiched by 45° prism made of optical glass of $SF_6$, and the reflectance thereof in a visible light range was evaluated.

The evaluation revealed that the reflectance of incident light was reduced significantly.

The incident light is totally reflected in a state in which there is a gap between the structural body 5 and the optical glass substrate 2, and hence it was confirmed that, in the optical element according to this example, the upper surface of the structural body was brought into contact with the substrate without a gap. In addition, it was confirmed that the lower surface of the structural body was also brought into contact with the above-mentioned optical glass substrate without a gap.

Example 3

In Example 3, an application example of the method of producing an optical element according to the second embodiment was carried out.

First, a frame portion and a linear structural body having a line of 56 nm, a space of 84 nm, and a pitch of 140 nm were formed on an optical glass substrate. After that, a frame portion and a linear structural body having a line of 118 nm, space of 22 nm, and a pitch of 140 nm were stacked thereon in a state where the line directions thereof were perpendicular to each other, thereby forming a first optical member.

Next, a second optical member including, on an optical glass substrate, a frame portion and a linear structural body having a line of 56 nm, a space of 84 nm, and a pitch of 140 nm was formed. The patterning was performed by use of lithography and dry etching. For materials of the frame portion and the structural body, titanium oxide ($TiO_2$) was used.

Next, the first optical member and the second optical member were placed in a vacuum chamber. Then, for cleaning and activating the first optical member and the second optical member, an argon ion beam was irradiated at 200 V for ten minutes with an ion beam gun.

Next, in a vacuum chamber of about 10e-5 Pa, the second optical member was disposed on the first optical member such that the frame portions 3 of the respective substrates are opposed to each other, that is, the frame portion of the first optical member and the frame portion of the second optical member were opposed to each other.

Then, heating was performed at 250° C. for one hour in a state in which portions corresponding to the frame portions were pressurized from above the second optical member in a direction such as indicated by outline arrows in FIG. 4D, whereby the frame portions of the first optical member and the second optical member were bonded to each other, and the space portion was vacuum-sealed, so that the optical element was formed.

After that, the optical element was exposed to the atmosphere, and thus the structural body of the first optical member and the structural body of the second optical member were brought into contact with each other. In this example, the activation step and the vacuum sealing were performed in the different vacuum chambers, but may be performed in the same chamber or in a consistent vacuum step, thereby improving the reproducibility. Incidentally, the above-mentioned optical element is designed suitable for a polarization beam splitter.

Figure 5:
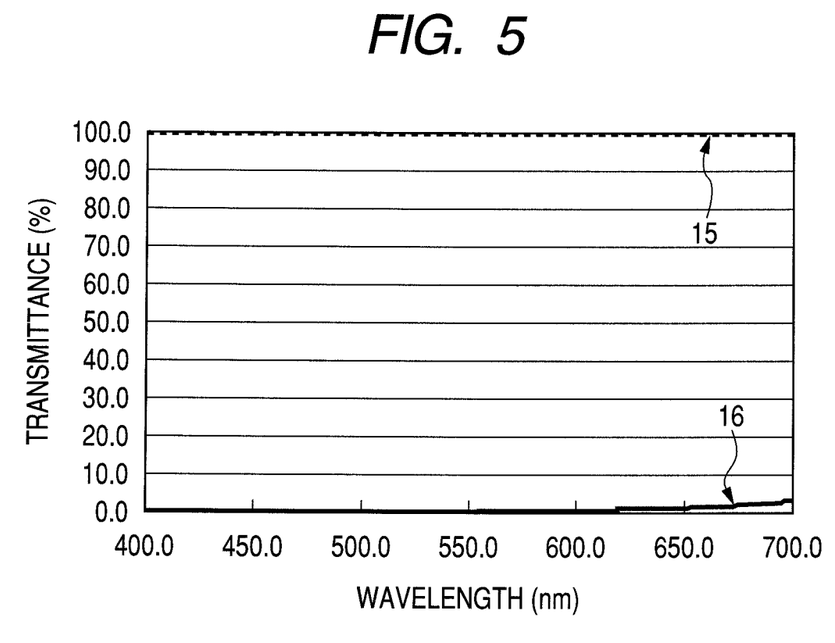
FIG. 5 is a graphical representation illustrating evaluation results of polarization characteristics in Example 3 of the present invention.

Next, a sample of the thus obtained optical element was sandwiched by 45° prism made of optical glass of $SF_6$, and polarization characteristics thereof were evaluated. Incidentally, the bonding was performed such that the line direction of the structural body being in contact with the substrate was parallel to an inclined surface of a prism. As a result, a polarization beam splitter having high polarization characteristics was obtained. FIG. 5 is a graphical representation illustrating measurement data thereof. In FIG. 5, the abscissa indicates wavelength, the ordinate indicates transmittance, a dashed line 15 represents a polarization transmittance of P-wave, and a solid line 16 represents a polarization transmittance of S-wave. It can be seen from FIG. 5 that only the P-wave effectively passes through the polarization beam splitter.

It was confirmed, in the optical element according to this example, that the first optical member and the second optical member were brought into contact with each other without a gap. Further, it was revealed that, also in the lower surfaces of the substrate and the structural body, the first optical member and the second optical member were brought into contact with each other without a gap.

Comparative Example 1

A comparative example of Example 3 is described.

A sample which involves a partly different producing step was produced in the same shape as that of the optical element produced in Example 3. A difference of the step is in the bonding step.

An optical element produced in Comparative Example 1 was a sample which was bonded in the atmosphere and sealed at the atmospheric pressure, and an object thereof is to compare polarization characteristics between the optical element which was vacuum-sealed and the optical element which is atmospheric pressure-sealed. Next, as with Example 3, the sample was sandwiched by 45° prism made of optical glass of $SF_6$, and the polarization characteristics thereof were evaluated. As a result, total reflection was induced, and the transmittances of the P-wave and the S-wave were both 0%.

Example 4

In Example 4, there is described a configuration example in which the optical element is exposed to the atmosphere, and then the optical element is heated, whereby the second optical member is closely bonded to the first optical member in the upper surfaces of the frame portion and the structural body thereof.

In this example, the optical elements obtained in Examples 1 to 3 were prepared and subjected to heating at 300° C. for one hour at the atmospheric pressure. Then, each of the optical elements was cut, and the contact parts of the first optical member and the second optical member thereof were observed.

As a result, it was confirmed that the contact parts of the first optical member and the second optical member continued to be bonded to each other after the cutting.

From the above, it was revealed that the contact parts between the first optical member and the second optical member as described in Examples 1 to 3 can be bonded to each other by heating. As a result of the bonding, the strength of the element was improved significantly.

While the present invention has been described with reference to exemplary embodiments, it is to be understood that the invention is not limited to the disclosed exemplary embodiments.

This application claims the benefit of Japanese Patent Application No. 2008-136579, filed May 26, 2008, and Japanese Patent Application No. 2009-125288, filed May 25, 2009, which are hereby incorporated by reference herein in their entirety.

The invention claimed is:

1. A method of producing an optical element, comprising:
    forming a frame portion and a plurality of structures having a period shorter than a wavelength of visible light in a space portion surrounded by the frame portion to thereby form a first optical member;
    disposing a second optical member on the frame portion of the first optical member in a reduced pressure environment to form an optical element in which the space portion surrounded by the frame portion is sealed in a pressure-reduced state; and
    taking out the optical element into the atmosphere to thereby bond the plurality of structures of the first optical member and the second optical member by a differential pressure between the atmospheric pressure and the pressure inside the space portion.

2. The method of producing an optical element according to claim 1, wherein the plurality of structures and the second optical member are brought into optical contact.

3. The method of producing an optical element according to claim 1, further comprising forming a second frame portion and a plurality of structures having a period shorter than a wavelength of visible light in a second space portion surrounded by the second frame portion to thereby form the second optical member.

4. The method of producing an optical element according to claim 1, wherein the formation of the optical element in which the first space portion is sealed in a pressure-reduced state comprises irradiating at least one of the first optical member and the second optical member with an energy wave to clean and activate a surface thereof before contacting the first optical member and the second optical member.

5. The method of producing an optical element according to claim 1, wherein the formation of the optical element in which the first space portion is sealed in a pressure-reduced state comprises exposing at least a part of a contact surface of the frame portion with the second optical member to hydrofluoric acid or hydrofluoric acid gas to be dissolved, and then disposing the second optical member.

6. The method of producing an optical element according to claim 1, further comprising, after bringing the structural body and the second optical member into close contact with each other, heating a contact portion between the plurality of structures and the second optical member.

* * * * *